R. STEEL & S. AUSTIN.
Car-Propellers.

No. 144,235. Patented Nov. 4, 1873.

WITNESSES:
Benj. Morison
Wm. H. Morison

INVENTORS:
Robert Steel
Samuel Austin

UNITED STATES PATENT OFFICE.

ROBERT STEEL AND SAMUEL AUSTIN, OF PHILADELPHIA, PA., ASSIGNORS OF ONE-HALF THEIR RIGHT TO JOSEPH LEEDS, OF SAME PLACE.

IMPROVEMENT IN CAR-PROPELLERS.

Specification forming part of Letters Patent No. 144,235, dated November 4, 1873; application filed December 20, 1872.

*To all whom it may concern:*

Be it known that we, ROBERT STEEL and SAMUEL AUSTIN, of the city of Philadelphia, in the State of Pennsylvania, have invented certain Improvements in Mechanical Motive-Powers and Brakes for Railway - Cars and other Vehicles, of which the following is a specification:

Our invention consists of one or more steel springs coiled on a shaft connected with cog-wheels, ratchet-wheels, and spring-pawls to propel the car, in combination with a brake to stop the car and a sliding bar to start the car, all constructed and arranged, in relation to the car, as will be hereinafter described, for the purpose of affording a novel mode of starting, running, and stopping a car.

Figure 1:
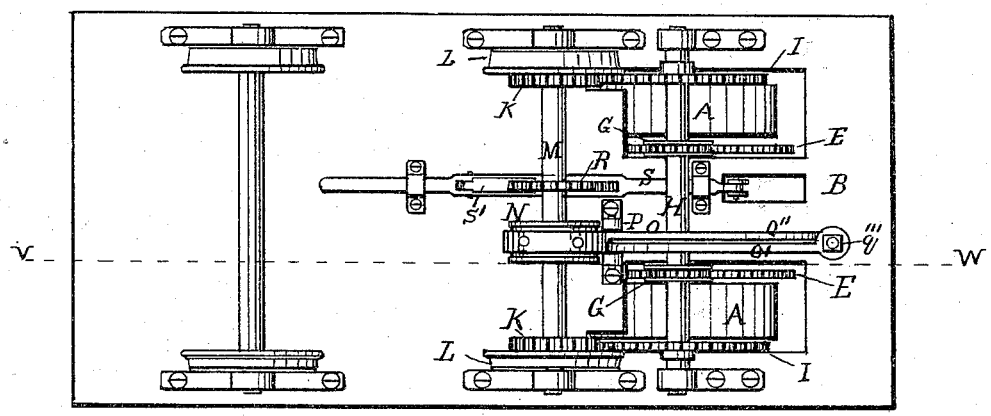
Figure 2:
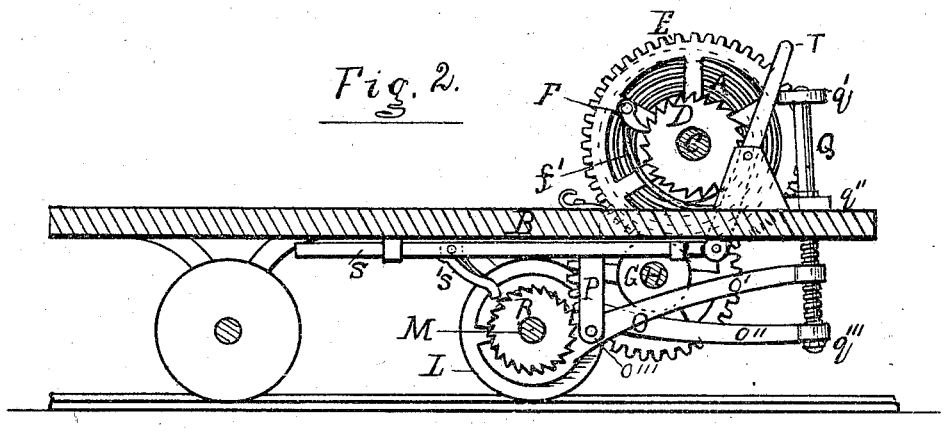
Figure 3:
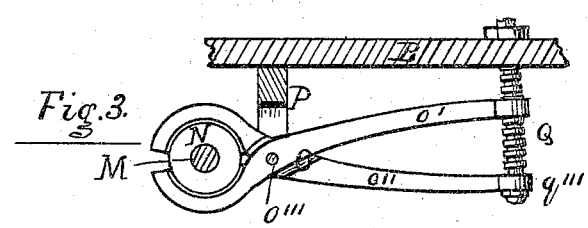

Figure 1 is a plan view of the under side of the platform of a city passenger-car embodying our invention. Fig. 2 is a vertical longitudinal section of the same above the dotted line $v w$ of Fig. 1. Fig. 3 is a side view of the brake as when in action as such, in connection with the cylinder on the axle, and with a section of the platform of the vehicle.

A A are two coiled, flat, spring-steel springs, one end of each of which is firmly secured to the platform B, and the other end firmly fixed to the shaft C, around which it winds, the said shaft rotating in suitably strong bearings, (not shown in the drawings,) which are firmly secured on the platform B. Suitable slots or openings are made through the said platform for the reception of the said springs. D (see Fig. 2) is one of two ratchet-wheels which are firmly fixed to the shaft C, one near each spring A A, and between each pair of the said ratchet-wheels and springs one of two main cog-wheels, E E, is secured, so as to turn around on the shaft C. Attached to the ratchet-wheel side of each of the cog-wheels E E, a pawl, F, and its actuating-spring $f'$, are arranged to act on the said wheel E, so as to prevent it from turning on its shaft, except when the springs are being wound up. One end of the shaft C projects sufficiently to admit of the attachment, through intermediate gearing, of suitable steam or horse power, to wind up the springs A A at the station from which the vehicle is to set out upon its circuit. Each of the large cog-wheels E E gear into respective pinions or smaller wheels G G, which are fixed on a rotary shaft, H, and near each end of said shaft H a large cog-wheel, I, is fixed, and gears into one of two smaller cog-wheels, K K, which are rigidly fixed to the respective track-wheels L L, which are fixed on the axle M of the vehicle. Near the mid-length of the axle M a cylinder, N, (see Fig. 1,) is fixed, and around this cylinder the clamping-jaws of the brake O are arranged. (See Figs. 2 and 3.) The said brake O consists of two crossing levers, O' O'', which have their connecting-fulcrum O''' secured through a stationary hanger, P, which is fixed to the under side of the platform B. The power ends of the levers of the said brake O extend forward into connection with a vertically-arranged operating-shaft, Q, which extends upward from said arms of the brake, through the platform B, into convenient reach of the attendant, and has a hand-wheel, $q'$, thereat, for giving leverage for rotating the same, and flanges $q''$ to prevent undue longitudinal movements of the said shaft within the plate which holds it firmly in position in the platform. Below the said platform the shaft is screw-cut, and the upper power-arm O' traverses the threads of the screw when the shaft Q is being rotated. The lower end of the said shaft Q has a reduced portion, and consequently a shoulder. The reduced portion passes through the end of the lower power end of the brake, and has a screw-nut, $q'''$, thereon, so fixed as to allow the end of lever-arm O'' to slip up and down, on the reduced portion, between the shoulder and the nut $q'''$, for the purpose of allowing the clamping end of said lever to rise a little from the face of the cylinder N when the said shaft Q is rotated to relax the gripe of the brake around the said cylinder. By rotating the shaft Q in the opposite direction the lower arm, O'', is supported by the nut $q'''$, and the upper arm is forced downward, and thus the clamping-jaws are caused to press upon the cylinder N and arrest the rotary motion of the axle M and track-wheels L L. For the purpose of giving an immediate start to the vehicle after each arrest by the action of the brake O, a strong ratchet-toothed wheel, R, is fixed (at any suitable point between the cylinder N and the track-wheel on that side)

to the axle M; and a sliding bar, S, with a pawl, s', attached thereto, is applied along the under side of the platform B, so as to pass directly over the ratchet-wheel R and cause the pawl s' to catch in the teeth of the said wheel R when the bar S is being drawn forward, and so also as to become disconnected from the wheel R when the said bar S is pushed fully backward. Motion is given to the bar S by the engine-man by means of the hand-lever T. It will therefore be seen that by means of said starting devices a sudden or immediate movement in a forward direction may be given to the vehicle, should it at any time be required.

We claim as our invention—

In combination with a railroad-car, one or more coiled springs, A A, cog-wheels I I and K K, ratchet-wheels D D, spring-pawls F F, brake O, and bar S, all the parts being arranged to operate substantially in the manner described, and for the purposes set forth.

ROBERT STEEL.
SAMUEL AUSTIN.

Witnesses:
 BENJ. MORISON,
 WM. H. MORISON.